May 20, 1947. W. E. WILSON 2,420,992
TOOL FOR REMOVING CARTRIDGE CORE TUBES IN RADIATORS
Filed March 29, 1944 2 Sheets-Sheet 1
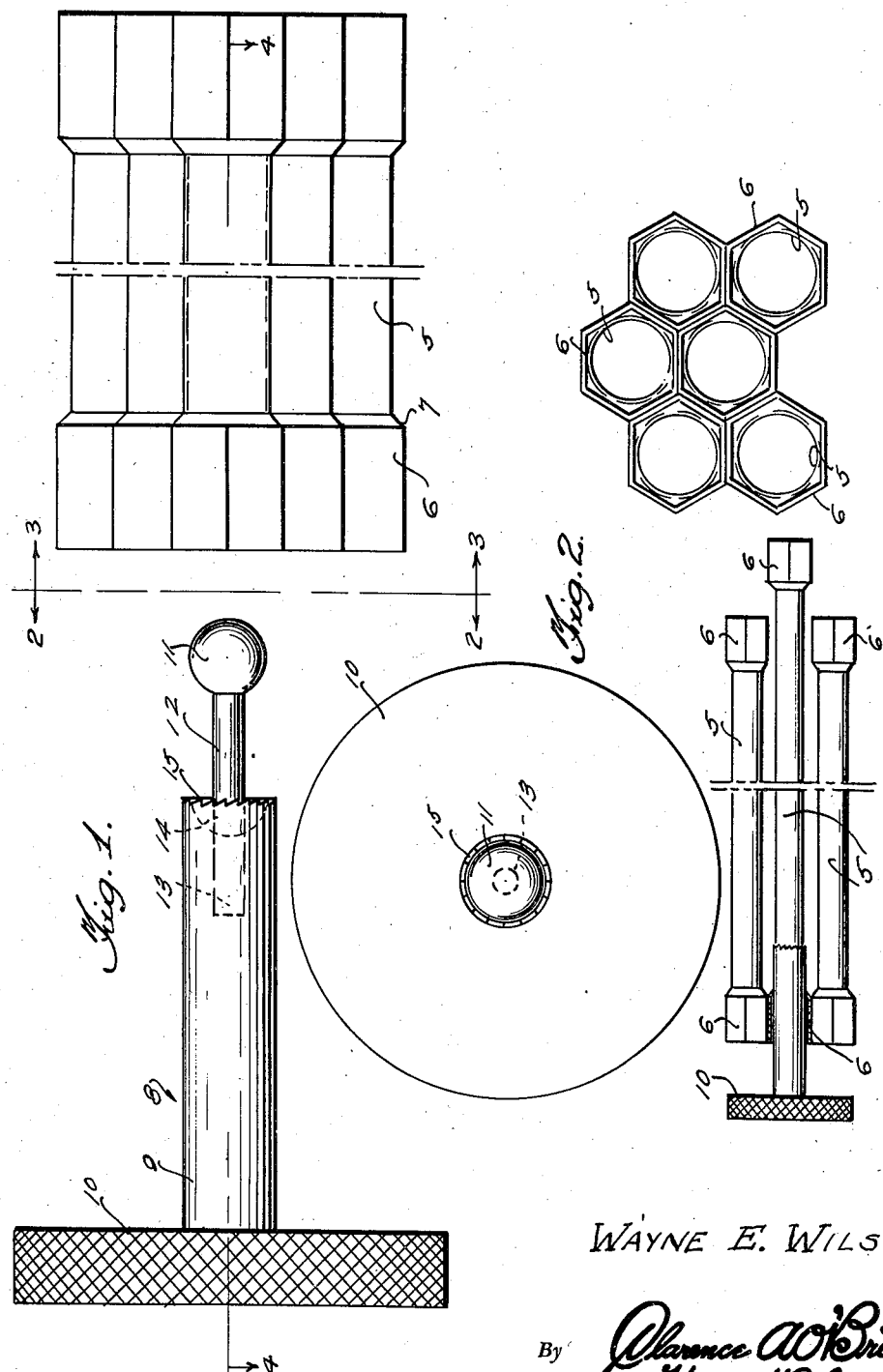
Inventor
WAYNE E. WILSON,

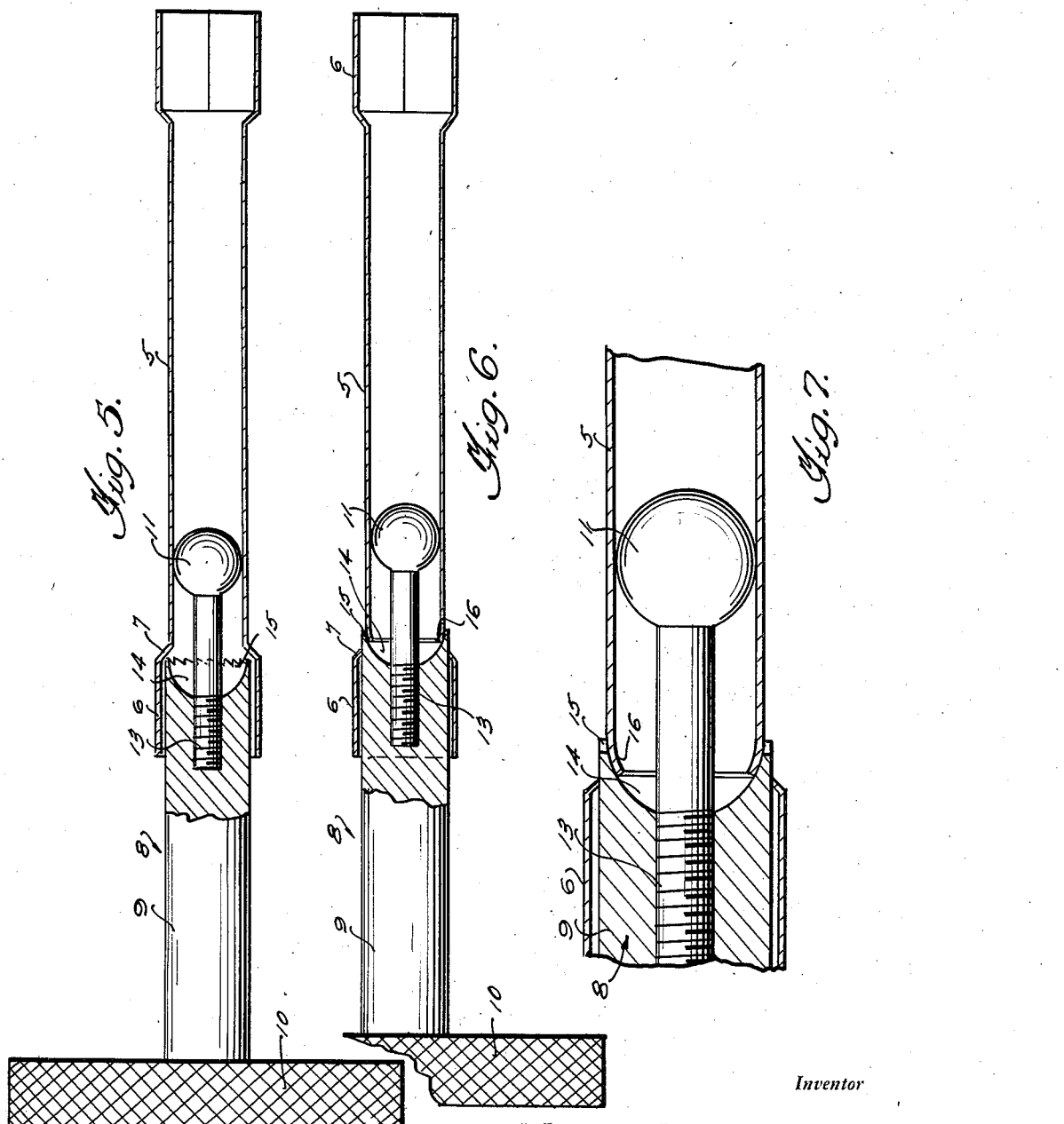

Patented May 20, 1947

2,420,992

UNITED STATES PATENT OFFICE 2,420,992

TOOL FOR REMOVING CARTRIDGE CORE TUBES IN RADIATORS

Wayne E. Wilson, Grant Park, Ill.

Application March 29, 1944, Serial No. 528,644

2 Claims. (Cl. 29—280)

This invention appertains to new and useful improvements in a tool for removing cartridge core tubes from aircraft radiators, oil temperature regulators, oil coolers, and the like.

The principal object of the present invention is to permit ready removal of core tubes so that they may be readily replaced.

Another important object of the invention is to provide a tool which can be easily manipulated with but very little effort exerted.

Another important object is to permit rapid repair of aircraft radiators, thus saving considerable time which is critically essential in war time.

Other objects and advantages of the invention will become apparent to the reader of the following description.

In the drawings—

Figure 1 is a side elevational view of the cutting tool shown about to be inserted into a radiator core.

Figure 2 is an end elevational view of the tool.

Figure 3 is an end elevational view showing a group of radiator core tubes.

Figure 4 is a side elevational view of adjacent core tubes, with the cutter tool having but one of the core tubes and shown in the act of displacing the same.

Figure 5 is a side elevational view, partly in section, of the tool about to cut a core tube.

Figure 6 is a fragmentary elevational and sectional view showing the tool after it has cut through the shoulder of the core tube.

Figure 7 is an enlarged fragmentary sectional view of the cutter and tube as shown in Figure 6.

Referring to the drawings wherein like numerals designate like parts, it can be seen that an aircraft radiator is generally built up of a plurality of elongated tubes 5 having hexagonal-shaped end portions 6. Between the tubes 5 and the ends 6 are oblique or flared shoulders 7.

The tool making up the present invention is generally referred to by numeral 8 and consists of an elongated cylinder 9 having a hand wheel 10 at its outer end, preferably knurled to permit firm grasping.

A pilot 11 of spherical or cylindrical shape has a shank 12 extending therefrom and provided with threads 13 for threaded disposition in a threaded bore at the outer end of the cylinder 9.

This end of the cylinder 9 is provided with a concavity 14. This concavity is so formed as to merge with the periphery of the cylinder 9 to form a fine cutting edge, this cutting edge being formed with cutting teeth 15.

It can now be seen, that when the pilot 11 is inserted into a damaged radiator core tube 5, the pilot will guide the tube 9 until the cutting teeth 15 abut the tube shoulder 7. The tool 8 may now be rotated and with but very little effort, will cut through the shoulder 7, the concaved portion of the cylinder 9 of the tool crimping the adjacent end of the tube 5 inwardly as denoted by reference character 16 to form an abutting portion against which the tool can push.

The opposite end of the tube 5 is now heated so as to melt the solder and in order that the tool can push the tube 5 to a separated position with respect to the adjacent tube ends.

The tube may now be removed, and the cut-off tube head 6 removed by a hook tool (not shown) while heat is being applied thereto in order to melt the solder which holds the same affixed to the adjacent tube end.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A tool for removing core tubes in radiators comprising a hand grip, a rotary structure projecting from the hand grip and provided with teeth at its outer end adapted to cut off core tube ends, and a pilot for the outer end of the rotary member comprising a relatively smaller shank extending axially from said outer end and a spherical end on said shank.

2. A tool for removing core tubes in radiators comprising a hand grip, a rotary cylindrical member projecting from the hand grip and provided with teeth at its outer end adapted to cut off core tube ends, and means for engaging a cut off tube end comprising a concavity in said outer end of the rotary member for crimping inwardly and bearing against the cut off end of a core tube said concavity merging into said teeth and forming therewith a toothed cutting edge around said outer end and a pilot extending from said outer end forwardly of said concavity and teeth.

WAYNE E. WILSON.

REFERENCES CITED

The following references are of record in the file of this patent:

UNITED STATES PATENTS

| Number | Name | Date |
|---|---|---|
| 1,559,395 | Withers | Oct. 27, 1925 |
| 2,280,068 | Frisch | April 21, 1942 |
| 1,646,384 | Bergstrom | Oct. 25, 1927 |
| 1,838,231 | Mason | Dec. 29, 1931 |
| 2,300,914 | Flindt | Nov. 3, 1942 |
| 25,289 | Taylor et al. | Aug. 30, 1859 |
| 1,316,201 | Tacke | Sept. 16, 1919 |
| 2,306,807 | Hulvey et al | Dec. 29, 1942 |
| 2,176,626 | Gentry | Oct. 17, 1939 |
| 1,557,464 | Mick | Oct. 13, 1925 |